United States Patent
Chazal et al.

(10) Patent No.: US 10,218,199 B2
(45) Date of Patent: Feb. 26, 2019

(54) SYSTEM OF BATTERIES AND METHOD OF CONTROLLING THIS SYSTEM

(71) Applicants: Renault s.a.s., Boulogne Billancourt (FR); Bouygues Energies et Services, Montigny le Bretonneux (FR)

(72) Inventors: Yann Chazal, Paris (FR); Cedric Chantrel, Charenton le Pont (FR); Brice Fourney, Clichy (FR); Fabrice Clin, Montigny le Bretonneux (FR); Do-Hieu Trinh, Fontenay le Fleury (FR)

(73) Assignees: RENAULT S.A.S., Boulogne Billancourt (FR); BOUYGUES ENERGIES ET SERVICES, Montigny le Bretonneux (FR)

( * ) Notice: Subject to any disclaimer, the term of this patent is extended or adjusted under 35 U.S.C. 154(b) by 136 days.

(21) Appl. No.: 15/313,624

(22) PCT Filed: May 22, 2015

(86) PCT No.: PCT/EP2015/061402
§ 371 (c)(1),
(2) Date: May 18, 2017

(87) PCT Pub. No.: WO2015/177346
PCT Pub. Date: Nov. 26, 2015

(65) Prior Publication Data
US 2017/0264126 A1    Sep. 14, 2017

(30) Foreign Application Priority Data
May 23, 2014   (FR) ...................... 14 54666

(51) Int. Cl.
H02J 7/00 (2006.01)
B60L 11/18 (2006.01)
B60R 16/023 (2006.01)

(52) U.S. Cl.
CPC ......... H02J 7/0068 (2013.01); B60L 11/1864 (2013.01); B60R 16/0231 (2013.01);
(Continued)

(58) Field of Classification Search
CPC .................................................. H02J 7/0068
(Continued)

(56) References Cited

U.S. PATENT DOCUMENTS

2010/0123989 A1    5/2010  Kosaki et al.
2012/0187759 A1*   7/2012  Kamichi ................. B60L 3/003
                                                                 307/10.1
(Continued)

FOREIGN PATENT DOCUMENTS

JP    S-54-103539    7/1979
JP    2010/124536    6/2010
(Continued)

OTHER PUBLICATIONS

Japanese Patent Office, Notification of Reasons for Refusal for Japan Application No. 2016-569976 dated Sep. 1, 2017 (7 pages including English Translation).
(Continued)

*Primary Examiner* — Suchin Parihar
(74) *Attorney, Agent, or Firm* — Brinks Gilson & Lione; John C. Freeman

(57) ABSTRACT

A system of electric batteries includes a plurality of batteries (HVB$_1$, HVB$_2$, HVB$_3$) connected to each other by two polarities. Each battery has at least two relays (RN, RP, RA) for the connecting of poles of the battery to the two polarities. The system includes a secondary power supply to
(Continued)

provide an activation energy to the relays. The system includes means of supervision to control the relays (RN, RP, RA) in a staggered manner so that each activation of a relay follows a previous activation by at least a predetermined time period (DT).

10 Claims, 3 Drawing Sheets

(52) U.S. Cl.
CPC .......... *H02J 7/0045* (2013.01); *H02J 7/0052* (2013.01); *H02J 7/0057* (2013.01); *B60L 2240/547* (2013.01); *B60L 2240/549* (2013.01); *B60L 2240/80* (2013.01); *H02J 2007/0095* (2013.01)

(58) Field of Classification Search
USPC .......................................... 320/126
See application file for complete search history.

(56) References Cited

U.S. PATENT DOCUMENTS

2014/0079960 A1   3/2014   Yun
2015/0239366 A1   8/2015   Jestin

FOREIGN PATENT DOCUMENTS

JP         2013-089411 A      5/2013
WO      WO 2014/037572      3/2014

OTHER PUBLICATIONS

Preliminary Search Report and Written Opinion dated Nov. 11, 2014 (8 pages) out of French priority Application No. 1454666.
International Search Report dated Sep. 11, 2015 (4 pages) out of PCT priority Application No. PCT/EP2015/061402.
Written Opinion dated Sep. 11, 2015 (6 pages) out of PCT priority Application No. PCT/EP2015/061402.

\* cited by examiner

SYSTEM OF BATTERIES AND METHOD OF CONTROLLING THIS SYSTEM

This application claims priority to International Application No. PCT/EP2015/061402 filed May 22, 2015; and to French Application No. 1454666 filed May 23, 2014; the entire contents of each are incorporated herein by reference.

BACKGROUND

The present invention relates to a system of batteries comprising a plurality of batteries connected to each other. It concerns a method for control of this system.

SUMMARY

In the field of electric and hybrid vehicles, but not limited to this, there is known a battery comprising a plurality of relays, with a secondary power supply arranged to provide control currents for the relays, and a supervisor to command the plurality of relays of the battery with the control orders.

In FIG. 1, illustrating a battery of the current art, the battery comprises three relays RA, RP and RN and a preload resistance Rprec, a voltage measuring instrument VHVB, a communication interface receiving the order to open and close the relays (CRA, CRP, CRN) and the resetting of the relays (ERA, ERP, ERN). The battery is connected to two polarities of a consumer circuit comprising one or more electronic power components of charger, inverter or DC/DC converter type; this component or these components determine the voltage $V_{HVN}$ between the two polarities. The preload resistance $R_{prec}$ has a large value in order to establish a limited current between the battery and the consumer circuit making it possible to balance the voltages between the battery and the polarities during a transitory phase.

The battery comprises a first relay RN and a second relay RP for direct connection respectively of a first pole (−) of the battery to a first one of the polarities and a second pole (+) to a second one of the polarities. Furthermore, it comprises a third relay RA connecting the second pole (+) to the second polarity across the preload resistance.

The battery is connected to the supervisor which controls the opening and closing of the relays $C_{RA}$, $C_{RP}$, $C_{RN}$ and which receives information ($E_{RA}$, $E_{RP}$, $E_{RN}$) as to the state of the relays, whether open or closed. The sequence of closing of the relays involves an initialization phase I and an establishment phase II, as shown in FIG. 2. During the initialization phase:

1) The supervisor verifies that the relays of the battery are open, namely, $E_{RA}=0$, $E_{RP}=0$ and $E_{RN}=0$. If this condition is verified:

2) The supervisor sends an order $C_{RA}=1$ for activation of the closing of the third relay $R_A$. The battery commands the activation of the closing of the third relay $R_A$. If the third relay $R_A$ is closed, the battery sends the state $E_{RA}=1$ to the supervisor.

3) If the supervisor receives the state ERA=1, it then sends an order CRN=1 for the closing of the first relay RN: the battery commands the closing of the first relay RN. If the first relay RN is closed, the battery sends the state ERN=1 to the supervisor.

4) The supervisor monitors whether the difference between VHVB and VHVN is less than a predetermined threshold, in which case it launches the establishment phase in which it sends an order for the closing of the second relay RP: CRP=1. The battery commands the closing of the second relay RP. If the second relay RP is closed, the battery sends the state ERP=1 to the supervisor.

5) If the supervisor receives the state $E_{RP}=1$, then the supervisor sends the order for the opening of the third relay $R_A$: $C_{RA}=0$. The battery commands the opening of the third relay $R_A$. If the third relay $R_A$ is open, the battery sends the state $E_{RA}=0$ to the supervisor.

The sequence is then finished.

Such a battery is designed to be used on its own in a vehicle. However, when the capacities of the battery are not sufficient to properly power a vehicle, or in order to then place the battery in a charging station, it is required to install a plurality of batteries of this type together.

It has been found that such a system of a plurality of batteries was not optimal, because in the event that a plurality of relays need to be supplied with control currents at the same time, the secondary power supply needs to be able to provide a substantial total current. In fact, the switching of a relay requires a rather high inrush current, for example on the order of 1 A, whereas in the steady state only a maintenance current on the order of 600 mA is necessary.

If a plurality of relays are commanded at the same time, the current to be provided by the secondary power supply is substantial and it is consequently necessary to calibrate it.

The invention aims at providing a battery system comprising a plurality of batteries and a secondary power supply whose size has been minimized as much as possible.

With these objectives in mind, the subject matter of the invention is a system of electric batteries comprising a plurality of batteries connected to each other by two polarities, each battery comprising at least two relays for the connecting of poles of the battery to the two polarities, the system comprising a secondary power supply to provide an activation energy to the relays, characterized in that it comprises means of supervision to control the relays in a staggered manner so that each activation of a relay follows a previous activation by at least a predetermined time period.

The system of supervision makes it possible to ensure that the inrush of current for the switching of the relays only involves a single relay at each instant of time. The time period is predetermined as a function of the characteristics of the relays so that the power supply current of the relay is already very close to the maintenance current level after the activation command and the expiration of said time period.

According to a first embodiment, the means of supervision comprise a secondary supervisor with each battery and a main supervisor connected to each of the secondary supervisors, each secondary supervisor being able to receive a connection order from the main supervisor and to control the successive staggered activation of the relays of the corresponding battery, the main supervisor being able to provide successive staggered connection orders such that a second order is given after a first order and after the relays controlled by the secondary supervisor having received the first order have been activated. Each secondary supervisor guarantees that the relays of the same battery are activated in succession. Moreover, since the main supervisor controls the secondary supervisors one after the other, with a sufficient interval between two consecutive commands, it is guaranteed that only one relay is in the activation phase at the same time. This system is simple to implement, since it takes up the secondary supervisors which individually manage a battery.

In a supplemental manner, the secondary supervisors send state information indicating that the relays are closed or not. The supervisor can thus synchronize the triggering of the consecutive orders as a function of this state information.

The total time period for commanding the assemblage of batteries is optimized as compared to a triggering of orders by a predefined interval which needs to be calibrated to the longest conceivable time periods.

According to a second embodiment, the means of supervision comprise a central supervisor able to command each relay individually. One can thus optimize the total time period to command the assemblage of batteries. In fact, the switching interval between two relays of the same battery is a function of the time to establish an equilibrium of voltages between the battery and the network to which it is connected. During this interval, which is generally longer than the time to establish the maintenance current of a relay, the activation of other relays can be commanded.

In particular, the battery comprises a first relay and a second relay for direct connection respectively of a first pole of the battery to a first one of the polarities and a second pole to a second one of the polarities, and furthermore a third relay connecting the second pole to the second polarity across a preload resistance.

In this configuration and according to the first embodiment, the secondary supervisor controls, for example, in the order of the third relay, the first relay and then the second relay. One thus accomplishes for each battery the connection to the load resistance and then the direct connection of the battery to the polarities.

In this configuration and according to the second embodiment, the central supervisor is programmed to command in an initialization phase the third and then the first relay of one of the batteries and then verify whether, for another battery whose initialization phase has been launched, the voltage difference between the second pole and the second polarity is less than a predetermined threshold, in which case the supervisor controls an establishment phase in which the second relay of said other battery is actuated. One can thus intercalate activations of relays between the activation of the first and the second relay of the same battery.

During the initialization phase, the times for commanding of the third and the first relay are spaced apart, for example, by a delay time. The delay time is adapted to the characteristics of the third relay, in particular, to its time period for establishment of the maintenance current.

In a supplemental manner, the establishment phase includes the commanding of the deactivation of the third relay. When the polarities are connected directly to the poles of the batteries, it is no longer necessary to use the preload resistance. Thus, it can be disconnected.

The invention also concerns a method for control of a system of electric batteries, the system comprising a plurality of batteries connected to each other by two polarities, each battery comprising at least two relays for the connecting of poles of the battery to the two polarities, the system comprising a secondary power supply to provide an activation energy to the relays, characterized in that the relays are controlled in a staggered manner so that each activation of a relay follows a previous activation by at least a predetermined time period.

BRIEF DESCRIPTION OF THE DRAWINGS

The invention will be better understood and other features and advantages will appear from the perusal of the following description, making reference to the enclosed drawings, in which.

DETAILED DESCRIPTION

Figure 1:
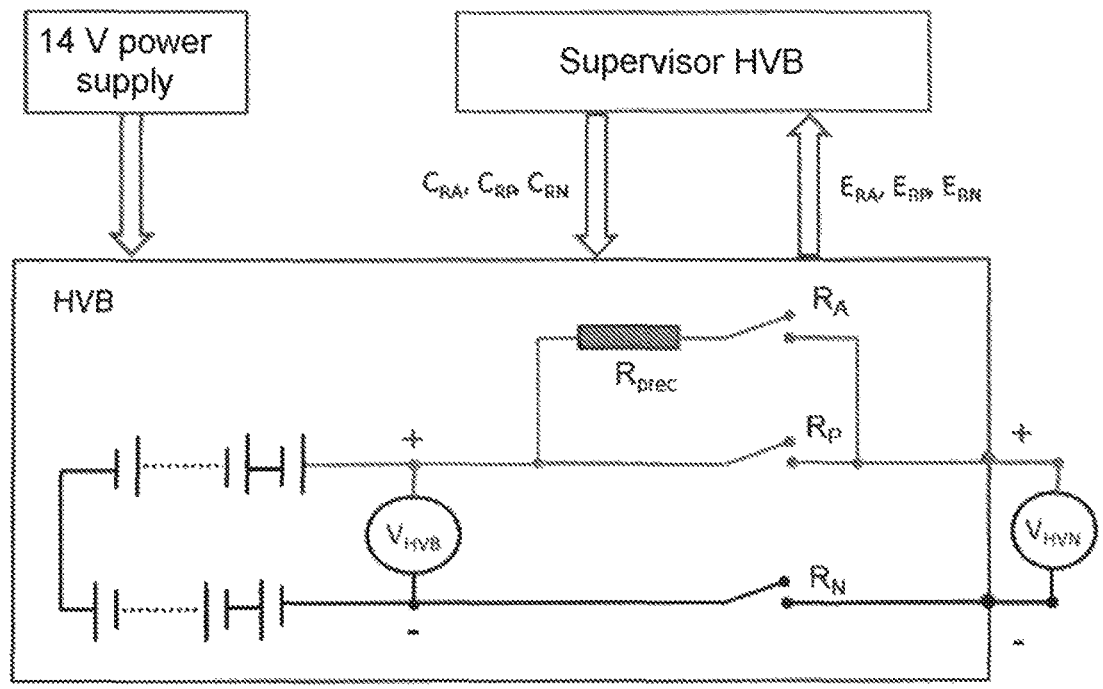
FIG. 1 shows schematically a battery and its supervisor according to the prior art.
Figure 2:
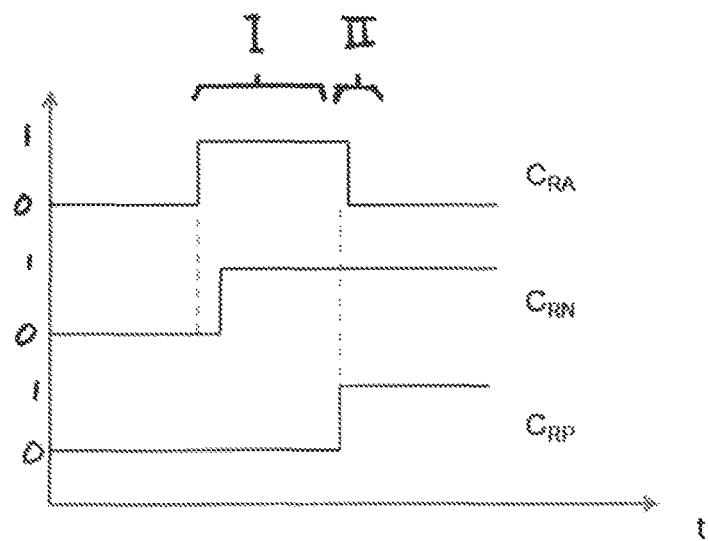
FIG. 2 is a time diagram of the control of the battery of FIG. 1.
Figure 3:
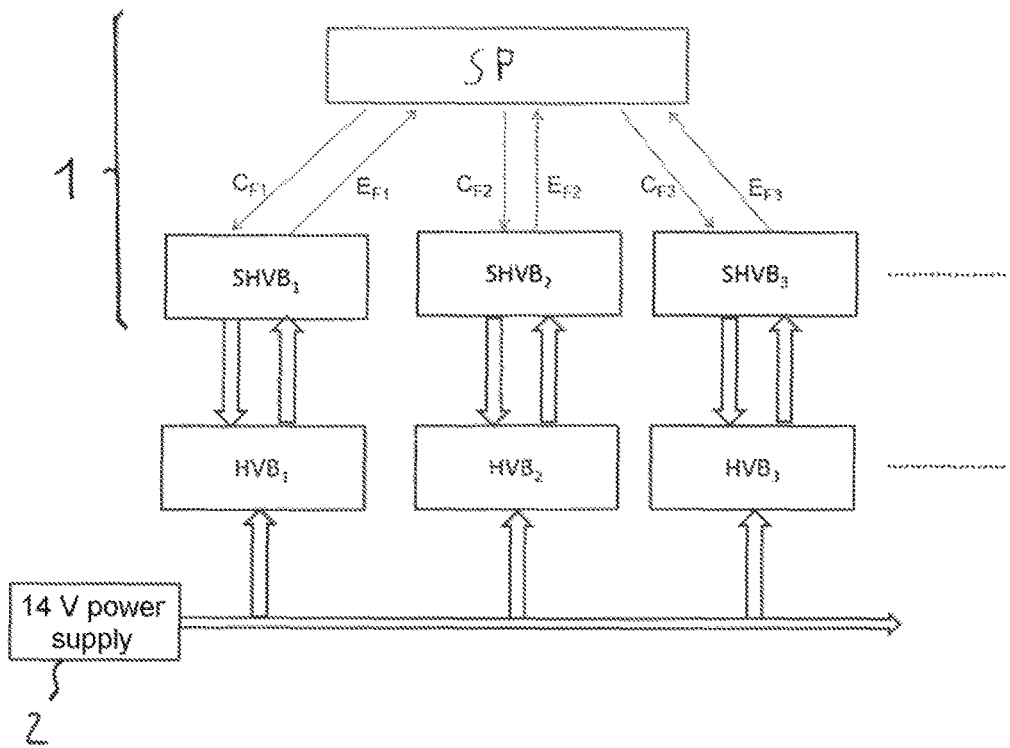
FIG. 3 shows schematically a battery system according to a first embodiment of the invention.
Figure 4:
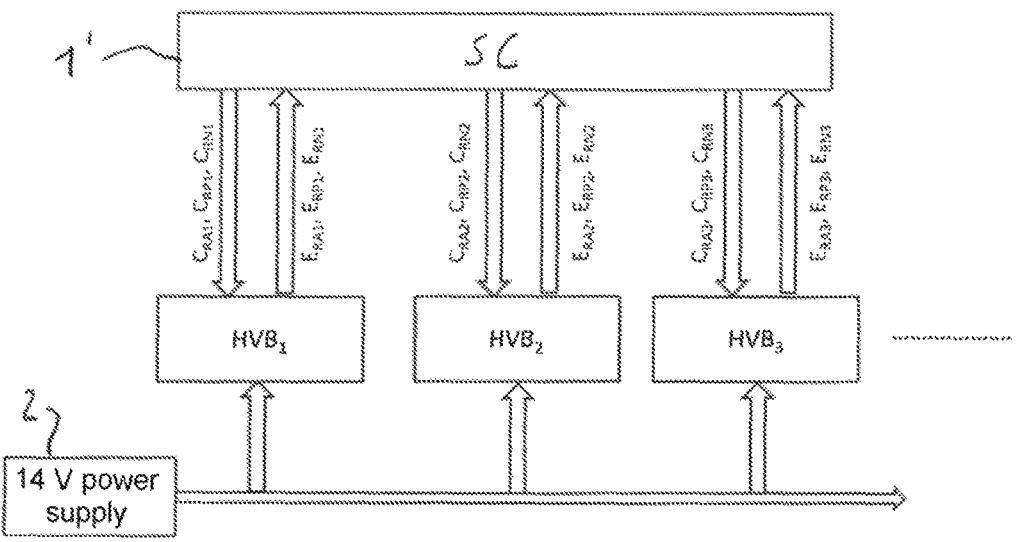
FIG. 4 shows schematically a battery system according to a second embodiment of the invention.

A system of electric batteries according to a first embodiment of the invention is shown in FIG. 3. The system comprises a plurality of batteries $HVB_1$, $HVB_2$, $HVB_3$, connected to each other by two polarities, each battery conforming to the battery described in the prior art and in connection with FIGS. 1 and 2. Thus, the battery comprises three relays for connecting poles of the battery to the two polarities. The system comprises a secondary power supply 2 common to all the batteries $HVB_1$, $HVB_2$, $HVB_3$ in order to provide an activation energy to the relays. Each battery is controlled by a secondary supervisor $SHVB_1$, $SHVB_2$, $SHVB_3$, while a main supervisor SP is connected to each of the secondary supervisors $SHVB_1$, $SHVB_2$, $SHVB_3$. The main supervisor SP and the secondary supervisors $SHVB_1$, $SHVB_2$, $SHVB_3$ form means of supervision I. Each secondary supervisor $SHVB_1$, $SHVB_2$, $SHVB_3$ is able to receive a connection order $C_{F1}$, $C_{F2}$, $C_{F3}$ from the main supervisor SP. Based on the reception of this connection order $C_{F1}$, $C_{F2}$, $C_{F3}$, the secondary supervisor $SHVB_1$, $SHVB_2$, $SHVB_3$ carries out the initialization phase and the establishment phase in the same way as in the prior art. Thus, the secondary supervisor $SHVB_1$, $SHVB_2$, $SHVB_3$ controls the successive staggered activation of the relays of the corresponding battery $HVB_1$, $HVB_2$, $HVB_3$.

The main supervisor SP, for its part, provides successive staggered connection orders $C_{F1}$, $C_{F2}$, $C_{F3}$ so as to ensure that all the relays controlled by the secondary supervisor $SHVB_1$ having received a first order $C_{F1}$ have been activated before delivering a second order $C_{F2}$ to the next secondary supervisor $SHVB_2$. For this, the secondary supervisors $SHVB_1$, $SHVB_2$, $SHVB_3$ send state information $E_{F1}$, $E_{F2}$, $E_{F3}$ to the main supervisor SP indicating that the phases of initialization and establishment have been completed, and the main supervisor SP sends the next connection order $C_{F1}$, $C_{F2}$, $C_{F3}$ after the predetermined time period. Thus, each activation of a relay follows a previous activation by at least the predetermined time period.

According to a second embodiment, shown in FIG. 3, the system of batteries differs from the system according to the first embodiment in that the means of supervision I' comprise a central supervisor SC able to command each relay individually. As in the prior art, the battery $HVB_1$, $HVB_2$, $HVB_3$ comprises a first relay RN and a second relay RP for direct connection respectively of a first pole (−) of the battery to a first one of the polarities and a second pole (+) to a second one of the polarities, and furthermore a third relay RA connecting the second pole (+) to the second polarity across a preload resistance $R_{prec}$.

Thus, the central supervisor SC is able to send activation commands $C_{RA1}$, $C_{RP1}$, $C_{RN1}$ for each relay RN, RP, RA of a first one of the batteries $HVB_1$, activation commands $C_{RA2}$, $C_{RP2}$, $C_{RN2}$ for each relay of a second one of the batteries $HVB_2$, activation commands $C_{RA3}$, $C_{RP3}$, $C_{RN3}$ for each relay of a third one of the batteries $HVB_3$, and so on. The central supervisor SC is able to receive states of the relays $E_{RA1}$, $E_{RP1}$, $E_{RN1}$ for each relay of the first battery $HVB_1$, states of the relays $E_{RA2}$, $E_{RP2}$, $E_{RN2}$ for each relay of the second battery $HVB_2$, states of the relays $E_{RA3}$, $E_{RP3}$, $E_{RNS}$ for each relay of the third battery $HVB_3$, and so on.

Figure 5:
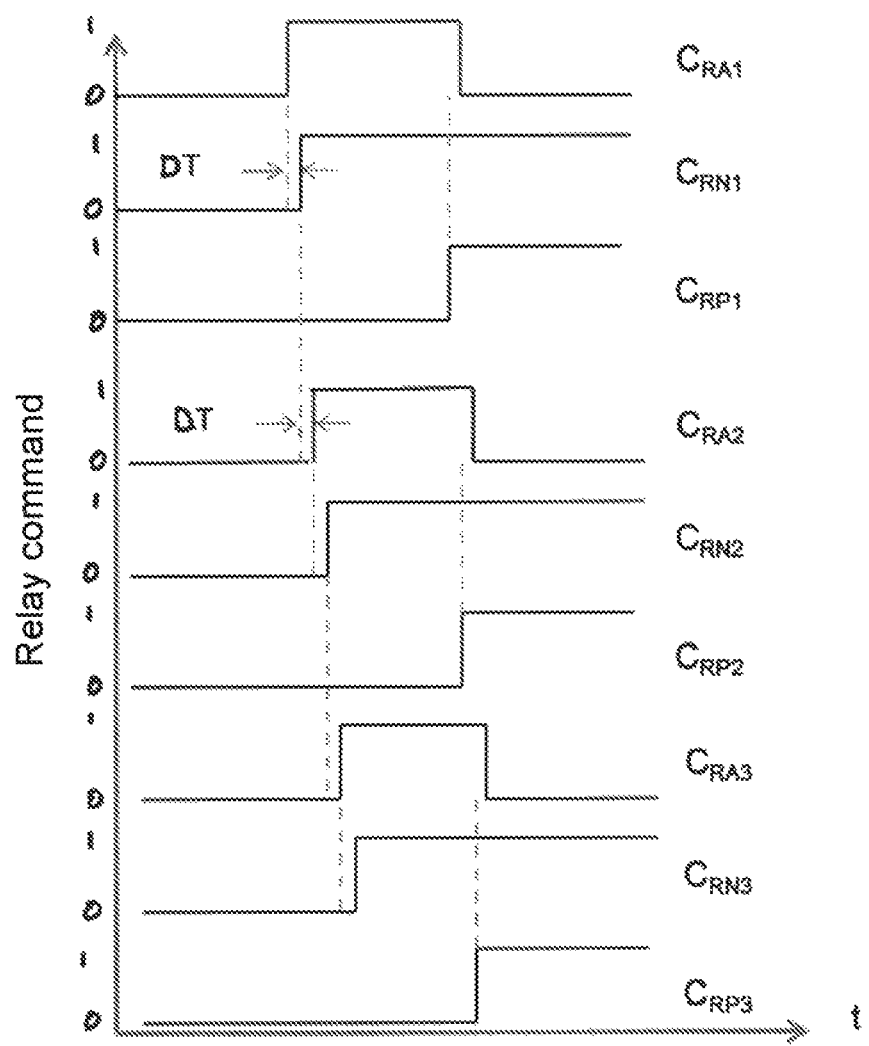
FIG. 5 is a time diagram explaining the operation of the system of FIG. 4.

For each battery $HVB_i$, referenced by an index i between I and n, n being the total number of batteries HVB of the system, the central supervisor SC is programmed to command successively in an initialization phase the third RA and then the first relay RN of the battery with index i, with a time staggering of at least one delay time DT, as shown by the first two curves $C_{RA1}$ and $C_{RN1}$ of the diagram in FIG. 5. Next, the central supervisor SC verifies, for a battery of index k between I and n, whether the initialization phase I has already been performed and whether the voltage difference between the second pole (+) and the second polarity $V_{HVB}-V_{HVN}$ is less than a predetermined threshold. In this case, the supervisor controls an establishment phase in which the second relay RP of the battery of index k is actuated and then the third relay RA is deactivated, as shown for example by the first and the third curve $C_{RA1}$ and $C_{RP1}$ of the diagram in FIG. 5. If no battery is in this case, the supervisor commands the initialization phase for the battery of index i+1 with a time staggering of at least the delay time DT between the command of the first relay RN of the battery with index i and the command of the third relay RA of the battery with index i+1, as shown for example by the fourth curve $C_{RA2}$ of the diagram.

For each activation or deactivation of one of the relays RN, RP, RA, the central supervisor SC monitors the state of the commanded relay, for example, the state $E_{RA1}$ for a command $C_{RA1}$. If the state does not correspond to the command after a certain time period, the supervisor assumes that the battery is out of service and disconnects it from the system by deactivating all its relays. If the state corresponds to the command, and the delay time DT has expired, the next command is authorized.

The invention claimed is:

1. A system of electric batteries comprising:
   a first battery and a second battery that are connected to each other by a first polarity and a second polarity, wherein the first battery comprises:
   a first relay and a second relay for direct connection respectively of a first pole of the first battery to the first polarity and a second pole of the first battery to the second polarity;
   a third relay connecting the second pole to the second polarity across a preload resistance of the first battery;
   a secondary power supply common to the first battery and the second battery to provide an activation energy to the first relay, the second relay, and the third relay;
   means of supervision arranged to control activation of the first relay, the second relay, and the third relay in a staggered manner so that each activation of a relay follows a previous activation by at least a predetermined time period as a function of characteristics of the first, second and third relays so that a power supply current of the relay is about the same as a maintenance current level after a preceding activation command and expiration of the time period, wherein the first battery and the second battery are connected in parallel, and the third relay is activated first for connection of each of the first and second batteries.

2. The system according to claim 1, wherein the second battery comprises:
   a first relay and a second relay for direct connection respectively of a first pole of the second battery to the first polarity and a second pole of the second battery to the second polarity;
   a third relay connecting the second pole to the second polarity across a preload resistance of the second battery;
   wherein the secondary power supply provides an activation energy to the first relay, the second relay, and the third relay of the second battery;
   wherein the means of supervision is arranged to control activation of the first relay, the second relay, and the third relay of the second battery in a staggered manner so that each activation of a relay follows a previous activation by at least a predetermined time period as a function of characteristics of the first, second and third relays so that a power supply current of the relay is about the same as a maintenance current level after a preceding activation command and expiration of the time period, wherein the third relay of the second battery is activated first for connection of each of the first and second batteries.

3. The system according to claim 2, wherein the means of supervision comprises:
   a first secondary supervisor associated with the first battery and a main supervisor connected to the first secondary supervisor; and
   a second secondary supervisor associated with the second battery and the main supervisor is connected to the second secondary supervisor, wherein each of the first secondary supervisor and the second secondary supervisor receives a connection order from the main supervisor and controls the successive staggered activation of the first, second, and third relays of the first battery and the second battery, and wherein the main supervisor provides successive staggered connection orders such that a second order is given after a first order and after the first, second, and third relays of the first battery and the second battery controlled by the first and second secondary supervisors having received the first order have been activated.

4. The system according to claim 3, wherein the first and second secondary supervisors controls for each of the first battery and the second battery, respectively, in order, the third relay, the first relay and then the second relay.

5. The system according to claim 4, wherein the first and second secondary supervisors send state information indicating that the first, second, and third relays for the first and second batteries are closed or not.

6. The system according to claim 2, wherein the means of supervision comprises a central supervisor to command each of the first, second, and third relays of the first battery and the second battery individually.

7. The system according to claim 6, wherein the central supervisor is programmed to command, in an initialization phase, the third relay and then the first relay of the first battery and then to verify whether, for the second battery whose initialization phase has been triggered, a voltage difference between the second pole of the second battery and the second polarity is less than a predetermined threshold, in which case the central supervisor controls an establishment phase in which the second relay of the second battery is actuated.

8. The system according to claim 7, wherein during the initialization phase, times for commanding of the third relay and the first relay of the first battery are spaced apart by a delay time.

9. The system according to claim 7, wherein the establishment phase comprises commanding of deactivation of the third relay.

10. A method for control of a system of electric batteries, the system comprising:
   a first battery and a second battery that are connected to each other by a first polarity and a second polarity, wherein the first battery comprises:
      a first relay and a second relay for direct connection respectively of a first pole of the first battery to the first polarity and a second pole of the first battery to the second polarity; and
      a third relay connecting the second pole to the second polarity across a preload resistance of the first battery;
   a secondary power supply common to the first battery and the second battery to provide an activation energy to the first relay, the second relay, and the third relay, the first, second, and third relays being controlled in a staggered manner so that each activation of a relay follows a previous activation by at least a predetermined time period as a function of the characteristics of the first, second, and third relays so that a power supply current of the relay is about the same as a maintenance current level after the preceding activation command and expiration of the time period, and the first battery and the second battery are connected in parallel,
   the method comprising first activating the third relay for the connection of each of the first and second batteries.

* * * * *